Aug. 25, 1942.  A. J. MAHR  2,294,091
METHOD OF CONNECTING STRANDED CABLES
Filed Nov. 20, 1939  2 Sheets-Sheet 1

INVENTOR
ALOYSIUS J. MAHR
BY E. M. Harrington
ATTORNEY

Aug. 25, 1942.  A. J. MAHR  2,294,091
METHOD OF CONNECTING STRANDED CABLES
Filed Nov. 20, 1939  2 Sheets-Sheet 2

INVENTOR
ALOYSIUS J. MAHR
BY E. M. Harrington
ATTORNEY

Patented Aug. 25, 1942

2,294,091

UNITED STATES PATENT OFFICE 2,294,091

METHOD OF CONNECTING STRANDED CABLES

Aloysius J. Mahr, St. Louis, Mo., assignor to James R. Kearney Corporation, St. Louis, Mo., a corporation of Missouri Application November 20, 1939, Serial No. 305,304

2 Claims. (Cl. 29—148)

This invention relates generally to an improved method of mechanically attaching and electrically connecting together sections of stranded cable and other elongated elements, and more specifically to such a method which involves the use of a sleeve into the opposite ends of which the end portions of cable sections or other elongated elements to be connected are introduced, after which the sleeve is subjected to rolling or other suitable operations to force the material of the sleeve into gripping contact with the adjacent end portions of the connected cable sections or other elongated elements, the predominant object of the present invention being to provide an improved method of connecting cable sections and other elongated elements so that the maximum mechanical gripping action is obtained between the connector sleeve and the end portions of the cable sections or other elongated elements connected thereby.

Figure 1:
Fig. 1 is a plan view of pair of cable sections connected together in accordance with this invention.

In the drawings, wherein is shown for the purpose of illustration, merely, one embodiment of the invention, A and B designate a pair of sections of stranded cable connected together, or to be connected together, in accordance with this invention. The sections of cable may each be formed of any suitable material, such, for instance, as six or seven spirally arranged strands of aluminum wire C and a steel, galvanized center wire D.

Figure 3:
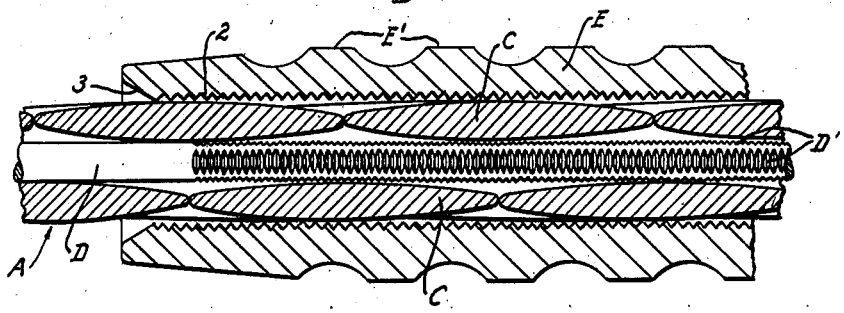
Fig. 3 is an enlarged fragmentary longitudinal section showing a connector sleeve assembled with a section of stranded cable but before the connector sleeve has been forced into gripping engagement with the associated cable section.
Figure 4:
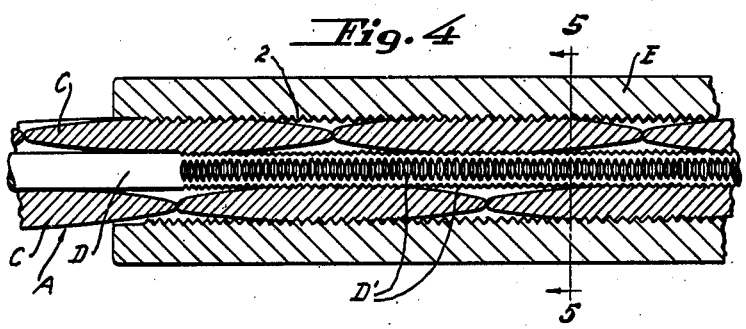
Fig. 4 is a view similar to Fig. 3 but showing the assembly after the connector sleeve has been forced into gripping relation with respect to the associated cable section.
Figure 5:
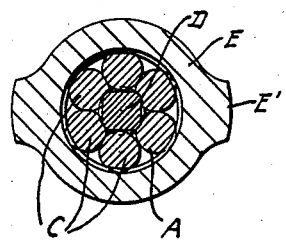
Fig. 5 is a cross-section taken on line 5—5 of Fig. 4.

In order to mechanically attach and electrically connect together the cable sections A and B a sleeve E is employed, said sleeve being formed of any suitable material, such, for instance as aluminum. On the external face of the sleeve E, as it appears before being permanently applied to the cable sections to connect same, raised portions or ribs E' are formed as shown to the best advantage in Fig. 3, said raised portions or ribs preferably, though not necessarily, being of spiral formation. At the inner face of the sleeve E, throughout substantially the entire length thereof, relatively shallow screwthreads 2 are formed thereon, and at opposite ends of the sleeve chamfers 3 are formed which facilitate introduction into the sleeve of end portions of cable sections to be connected by the sleeve, one of such chamfered ends of the sleeve being illustrated in Fig. 3. The internal diameter of the sleeve E is of sufficiently greater diameter than the external diameter of the cable sections to permit said cable sections to be moved freely into the sleeve without interference from the screwthreads 2.

In connecting a pair of cable sections in accordance with this invention the end portion of each of the cable sections to be connected is unwrapped to expose a portion of the center wire which is of a length approximately one half of the length of the sleeve E. The exposed portion of the center wire is knurled or roughened with the aid of a tool such as the tool T illustrated in Fig. 6. The tool T comprises a pair of elements T' which are pivoted together at $T^2$ to provide handles $T^3$ and jaws $T^4$. Supported for rotation by the jaws $T^4$ is a pair of knurling or roughening rolls $T^5$, there being a pair of guide elements $T^6$ at the opposite ends of the rolls $T^5$ which are pivotally supported by one jaw of the tool and are slotted as indicated at $T^7$ to permit the jaws and the rolls to move toward and from each other.

To knurl or roughen a portion of the center wire of an end portion of a cable section the knurling or roughening rolls $T^5$ of the tool T are separated and the center wire of the cable section is moved between said separated rolls until the rolls are located at the innermost end of the portion of the center wire which is to be knurled or roughened. The handles $T^3$ of the tool T are then squeezed together whereby the rolls are forced tightly against the center wire, and while the center wire is held stationary the tool is pulled longitudinally of the portion of the center wire which is to be roughened until the rolls $T^5$ pass off of the outer end of the center wire. During such movement of the tool longitudinally of the portion of the center wire being roughened, the rotating rolls $T^5$ will bite into the material of the center wire to knurl or roughen same. This knurling or roughening operation is repeated several times at points spaced circumferentially of the center wire to provide the center wire with a plurality of knurled or roughened strips which are spaced circumferentially and extend longitudinally of the end portion of the center wire as indicated at $D'$.

Figure 2:
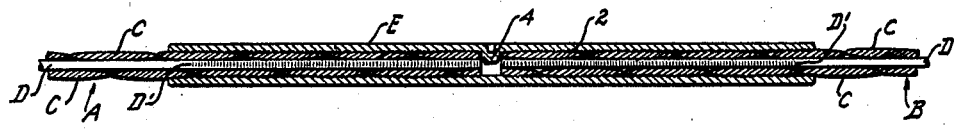
Fig. 2 is a section taken on line 2—2 of Fig. 1.

When the center wires of the cable sections have been roughened as described and the end portions of said cable sections have been rewrapped to their normal, stranded condition, the end portions of said cable sections are introduced into the opposite ends of the sleeve E until the ends of said cable sections abut against an inwardly extended abutment 4 which is formed within the sleeve by a punch operation, or otherwise (Fig. 2). The sleeve E is then subjected to a rolling, swedging, or other suitable operation, which compresses the sleeve and forces the material of the wall of said sleeve into tight, gripping contact with the end portions of the cable sections located within said sleeve. When the sleeve E is compressed as described the screwthreads within the sleeve are caused to bite into the spiral strands C of the end portions of the cable sections connected by the sleeve, and also such compression of the sleeve causes said spiral strands C of the portions of the cable sections located within the sleeve to be forced tightly against the center wire D so that the sharp, higher portions of the knurled or roughened portions of said center wire bite into the spiral strands of the cable sections. As a result of the biting action between the screwthreads of the sleeve and the spiral strands of the cable sections, and between the roughened portions of the center wires of the cable sections and the spiral strands of said cable sections, the cable sections are very securely connected together by the sleeve so that the likelihood of movement of the cable sections with respect to the sleeve is very greatly reduced.

Figure 6:
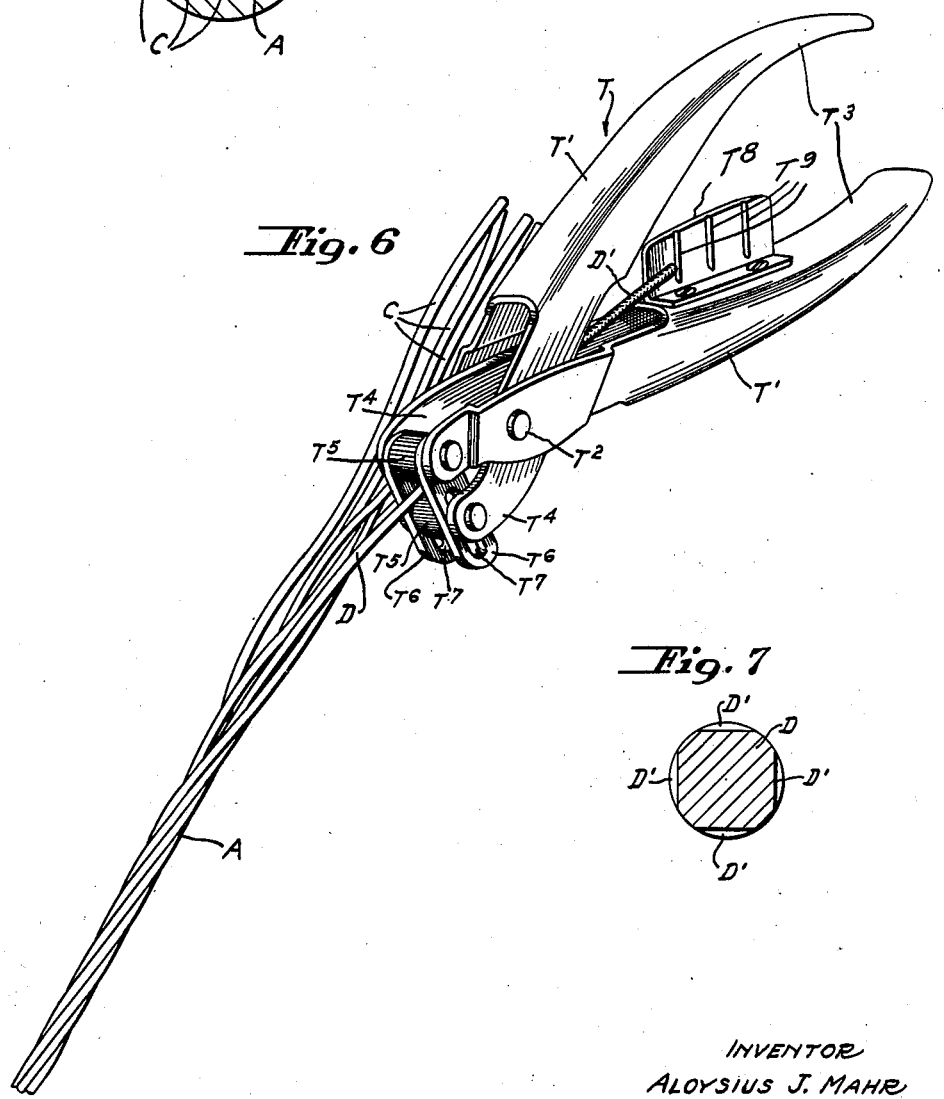
Fig. 6 is a perspective illustrating the manner in which the center wire of a cable section to be connected in accordance with this invention is preliminarily knurled or roughened.
Figure 7:
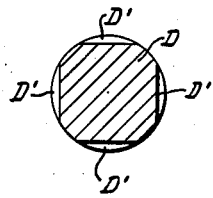
Fig. 7 is an enlarged cross-section of the center wire of a cable section showing same as it appears after it has been knurled or roughened in the manner illustrated in Fig. 6.

As shown in Fig. 6 the tool T has fixed to one of the handles thereof an element $T^8$ which is provided with spaced markings $T^9$. The markings $T^9$ of the element $T^8$ serve to indicate how far inwardly of the center wire D of a cable to be connected in accordance with the invention, the tool should be moved to knurl said center wire for a sleeve E of a predetermined length. In other words if the shortest sleeve is to be employed the tool will be moved inwardly of the center wire until the outer end of the center wire is even with the marking $T^9$ which is closest to the pivot of the tool, while, if a longer sleeve is to be employed the tool is moved inwardly of the center wire of the cable until the outer end of the center wire is even with the intermediate marking $T^9$, or with the marking $T^9$ which is furtherest from the pivot of the tool, depending on the length of the sleeve to be used. By providing the element $T^8$ and its markings $T^9$ there is very little likelihood that knurled portions would be produced of such excessive length that they would extend beyond an end of the sleeve.

I claim:

1. The herein described method of connecting a pair of stranded cables of the type comprising each a plurality of metallic strands wound spirally about a metallic center strand, said method comprising preliminarily roughening the surface of an end portion of the normally smooth center strand of each cable section, introducing end portions of the pair of stranded cables to be connected into opposite ends of a sleeve, and forcing the material of the wall of the sleeve into tight gripping contact with the portions of the stranded cables located within said sleeve so as to force the spiral strands of said stranded cables into biting contact with the roughened portions of said center strands of said stranded cables.

2. The herein described method of connecting a pair of stranded cables of the type comprising each a plurality of metallic strands wound spirally about a metallic center strand, said method comprising unwrapping an end portion of each of said stranded cables to expose the center strand thereof, roughening the normally smooth surfaces of the exposed center strands of the stranded cables, rewrapping the end portions of the stranded cables, introducing the rewrapped end portions of the stranded cables into opposite ends of a sleeve which is internally screwthreaded, and forcing the material of the wall of said sleeve into tight gripping contact with the portions of the stranded cables located within said sleeve so as to force the internal screwthreads of the sleeve into biting contact with said portions of stranded cables and to force the spirally arranged strands of said stranded cables into biting contact with the roughened portions of the center strands of said stranded cables.

ALOYSIUS J. MAHR.